US008051055B1

(12) United States Patent
Gelbart et al.

(10) Patent No.: US 8,051,055 B1
(45) Date of Patent: Nov. 1, 2011

(54) TRACKING TABLE AND INDEX PARTITION USAGE IN A DATABASE

(75) Inventors: Sigal Gelbart, Hod Hasharon (IL); Meyron Ragulsky, Nes Ziona (IL); Liad Hacmon, Or Yehuda (IL); Ehud Eshet, Modiin (IL); Yochai Uliel, Jerusalem (IL)

(73) Assignee: Precise Software Solutions Inc., Redwood Shores, CA (US)

( * ) Notice: Subject to any disclaimer, the term of this patent is extended or adjusted under 35 U.S.C. 154(b) by 515 days.

(21) Appl. No.: 12/188,091

(22) Filed: Aug. 7, 2008

Related U.S. Application Data

(60) Provisional application No. 61/086,792, filed on Aug. 6, 2008.

(51) Int. Cl.
*G06F 7/00* (2006.01)
*G06F 17/00* (2006.01)
*G06F 17/30* (2006.01)
*G06F 3/00* (2006.01)

(52) U.S. Cl. ......... 707/696; 707/688; 707/711; 715/721

(58) Field of Classification Search .................. 345/400; 717/127
See application file for complete search history.

(56) References Cited

U.S. PATENT DOCUMENTS

| | | | |
|---|---|---|---|
| 7,376,682 B2 * | 5/2008 | Ramacher et al. | 1/1 |
| 7,673,291 B2 * | 3/2010 | Dias et al. | 717/127 |
| 2004/0169654 A1 * | 9/2004 | Walker et al. | 345/440 |
| 2005/0086246 A1 * | 4/2005 | Wood et al. | 707/101 |
| 2007/0118730 A1 * | 5/2007 | Platt | 713/2 |

* cited by examiner

*Primary Examiner* — Susan Chen
(74) *Attorney, Agent, or Firm* — Mark M. Friedman (57) ABSTRACT

Apparatus, methods and computer-readable medium for displaying information related to performance of a given database statement which accesses a plurality of multi-partition objects during a time interval. In some embodiments, the method comprises: a) determining, for a given database statement that accesses a plurality of index or table partitions during the time interval, for each accessed partition of a plurality of partitions, a respective aggregate wait time associated with said accessed partition; b) in accordance with the determined wait times for the given database statement, presenting, to a user, a description of performance of the database during the time interval.

12 Claims, 9 Drawing Sheets

TRACKING TABLE AND INDEX PARTITION USAGE IN A DATABASE

CROSS-REFERENCE TO RELATED APPLICATIONS

This patent application claims the benefit of U.S. Provisional Patent Application No. 61/086,792 filed Aug. 6, 2008 by the present inventors.

BACKGROUND OF THE INVENTION

1. Field of the Invention

The present invention relates to methods, apparatus and computer-code for acquiring and presenting information related to database performance.

2. Background and Related Art

It is common for large or "heavy" database tables or indexes to be partitioned into multiple "table partitions" or "index partitions." During statement tuning, users (i.e. DBAs) need to identify how many partitions were accessed, and which partitions were accessed by the statement. This may affect statement response time dramatically.

Unfortunately, may be difficult to track I/O wait time by table or index partition identity because: (i) for many statements (i.e. the overwhelming the majority of statements in many applications), it is difficult to determine how many or which partitions were accessed during execution of a given statement (i.e. for most statements, this information is not available from the SQL statement execution plan generated by the query optimizer); (ii) even if it were known which partitions were accessed, it would be difficult to determine the relative wait-time contributions of each partition when accessing a given table or index.

Thus, there is an ongoing need for a tool which can track table or index partition access. Furthermore, it would be possible provide a number of database tuning applications using the aforementioned currently-unavailable functionality for tracking I/O wait time by table or index partition identity. These tuning applications are discussed below.

SUMMARY OF EMBODIMENTS

It is now disclosed for the first time a method for displaying information related to performance of a given database statement which accesses a plurality of multi-partition objects during a time interval, the method comprising: a) determining, for a given database statement that accesses a plurality of index or table partitions during the time interval, for each accessed partition of a plurality of partitions, a respective aggregate wait time associated with said accessed partition; b) in accordance with the determined wait times for the given database statement, presenting, to a user, a description of performance of the database during the time interval.

According to some embodiments, step (a) is carried out for a plurality different database statements, each database statement being associated with a different plurality of partition aggregate wait times.

According to some embodiments, presenting of the description of the database performance includes presenting indications of the plurality of the determined aggregate wait times.

According to some embodiments, presenting of the description of the database performance includes a presenting, for each accessed partition, an indication of a ratio between: i) said respective aggregate wait time associated with said accessed partition; and ii) a total wait time associated with executing the given database statement during the time interval.

According to some embodiments, the presented indications are ranked in accordance with relative magnitudes of the ratios.

It is now disclosed for the first time a method for displaying information related to performance of a database during a time interval, the method comprising: a) determining, for a given multi-partition table or multi-partition index that is accessed by a plurality of database statements during the time interval, a respective aggregate wait time, for the time interval, for each partition of the multi-partition table or index; and b) in accordance with the determined wait times for the given database statement, presenting, to a user, a description of performance of the database during the time interval.

According to some embodiments, step (a) is carried out for a plurality different database tables, each database table being associated with a different plurality of partition aggregate wait times.

According to some embodiments, step (a) is carried out for a plurality different database indexes, each database index being associated with a different plurality of partition aggregate wait times.

According to some embodiments, presenting of the description of the database performance includes a presenting, for each accessed partition, an indication of a ratio between: i) said respective aggregate wait time associated with said accessed partition; and ii) an aggregate wait time for the multi-partition index or table for the time interval. This ratio may be indicative of 'relative contributions' to wait time associated with each partition. In the event that one partition has a 'large contribution,' this may be useful information for tuning the database.

According to some embodiments, the presented indications are ranked in accordance with relative magnitudes of the ratios.

It is now disclosed for the first time a method for displaying information related to performance of a database during a time interval, the method comprising: a) determining, for a given partition that is part of a multi-partition table or index, the given partition being that is accessed by a plurality of database statements during the time interval, a respective aggregate wait time for the time interval for each accessing database statement of the given partition; and b) in accordance with the determined wait times for the given partition, presenting, to a user, a description of performance of the database during the time interval.

According to some embodiments, step (a) is carried out for a plurality of different partitions, each partition being associated with a different plurality of partition aggregate wait times.

According to some embodiments, presenting of the description of the database performance includes presenting indications of the plurality of the determined aggregate wait times.

According to some embodiments, presenting of the description of the database performance includes a presenting, for each accessing database statement, an indication of a ratio between: i) said respective aggregate wait time associated with access of the accessing database statement to the given partition; and ii) a total wait time associated with partition during the time interval.

According to some embodiments, presented indications are ranked in accordance with relative magnitudes of the ratios.

It is now disclosed for the first time a system for displaying information related to performance of a given database statement which accesses a plurality of multi-partition objects during a time interval, the system comprising: a) a performance-data handler operative to determine, for a given database statement that accesses a plurality of index or table partitions during the time interval, for each accessed partition of a plurality of partitions, a respective aggregate wait time associated with said accessed partition; b) a performance-data presentation interface operative, in accordance with the determined wait times for the given database statement, to present, to a user, a description of performance of the database during the time interval.

It is now disclosed for the first time a system for displaying information related to performance of a given database statement which accesses a plurality of multi-partition objects during a time interval, the system comprising: a) performance-data handler operative to determine, for a given database statement that accesses a plurality of index or table partitions during the time interval, for each accessed partition of a plurality of partitions, a respective aggregate wait time associated with said accessed partition; b) a performance-data presentation interface operative, in accordance with the determined wait times for the given database statement, to present, to a user, a description of performance of the database during the time interval.

It is now disclosed for the first time a system for displaying information related to performance of a given database statement which accesses a plurality of multi-partition objects during a time interval, the system comprising: a) performance-data handler operative to determine, for a given database statement that accesses a plurality of index or table partitions during the time interval, for each accessed partition of a plurality of partitions, a respective aggregate wait time associated with said accessed partition; b) a performance-data presentation interface operative, in accordance with the determined wait times for the given database statement, to present, to a user, a description of performance of the database during the time interval.

It is now disclosed for the first time a computer readable medium comprising program instructions, the computer readable medium for facilitating the display of information related to performance of a given database statement which accesses a plurality of multi-partition objects during a time interval, wherein when executed the program instructions are operable to: a) determine, for a given database statement that accesses a plurality of index or table partitions during the time interval, for each accessed partition of a plurality of partitions, a respective aggregate wait time associated with said accessed partition; b) in accordance with the determined wait times for the given database statement, present, to a user, a description of performance of the database during the time interval.

It is now disclosed for the first time a computer readable medium comprising program instructions, the computer readable medium for facilitating the display of information related to performance of a given database statement which accesses a plurality of multi-partition objects during a time interval, wherein when executed the program instructions are operable to: a) determining, for a given database statement that accesses a plurality of index or table partitions during the time interval, for each accessed partition of a plurality of partitions, a respective aggregate wait time associated with said accessed partition; b) in accordance with the determined wait times for the given database statement, presenting, to a user, a description of performance of the database during the time interval.

It is now disclosed for the first time a computer readable medium comprising program instructions, the computer readable medium for facilitating the display of information related to performance of a given database statement which accesses a plurality of multi-partition objects during a time interval, wherein when executed the program instructions are operable to: a) determining, for a given database statement that accesses a plurality of index or table partitions during the time interval, for each accessed partition of a plurality of partitions, a respective aggregate wait time associated with said accessed partition; b) in accordance with the determined wait times for the given database statement, presenting, to a user, a description of performance of the database during the time interval.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word may is used in a permissive sense (i.e., meaning having the potential to'), rather than the mandatory sense (i.e. meaning must).

DESCRIPTION OF EMBODIMENTS

The present invention will now be described in terms of specific, example embodiments. It is to be understood that the invention is not limited to the example embodiments disclosed. It should also be understood that not every feature of the presently disclosed system, method and computer-readable code for acquiring and displaying information related to database performance is necessary to implement the invention as claimed in any particular one of the appended claims. Various elements and features of devices are described to fully enable the invention. It should also be understood that throughout this disclosure, where a process or method is shown or described, some of the steps of the method may be performed in any order or simultaneously, unless it is clear from the context that one step depends on another being performed first. The general principles described herein may be applied to other embodiments and applications without departing from the scope of the invention. Thus, the present invention is not to be limited to the embodiments shown, but is to be accorded the widest scope consistent with the principles and features described herein.

The present inventors are now disclosing that it is possible, during execution of a database to (i) detect when a database statement accesses a particular partition of a multi-partition table or index and is 'waiting for' the particular table or index (i.e. when the database statement executes, it must wait for an I/O operation involving the partition to complete or for a lock to be removed from partition of the index or table); (ii) determine, over a period of time, aggregate wait times for each partition; and (iii) present a description of database performance in accordance with the aforementioned 'partition-specific' wait-times.

Thus, in one use case, it is possible to determine for a given multi-partition table or object, a respective aggregate wait (i.e. for the time interval) for each partition of a plurality of partitions of the multi-partition table or object. This may be useful, for example, when tuning a database. In the event that a given table or index is associated with a 'large amount' of wait time, it may be useful to know which partition of the table or index most contributes to the 'heaviness' of the object. Upon presenting this information to a user (for example, a DBA), the DBA may take any one of several actions to improve database performance (and in some embodiments, one or more recommendations may be presented).

For example, the DBA may improve the hardware or infrastructure associated with the given partition (for example, a faster disk or better network card). Alternatively, the database administrator may re-write one or more statements, or may add or drop and index, or take any other action.

Thus, the first case (also see FIG. 4B) relates to decomposing relative contributions of table wait time (i.e. for a multi-partition table) or index wait time (i.e. for a multi-partition index) or some combination thereof on a 'per-partition basis' (see FIGS. 5A-5B). This data may then be presented to a user.

In a second use case (also see FIG. 4A), instead of decomposing 'wait time' contributions of a multi-partition index or multi-partition table on a 'per-partition basis,' it may be useful for decomposing 'wait time' contributions for a database statement that accesses multiple partitions during a time interval. In the event that the particular database statement spends an inordinate amount of time accessing a particularly 'heavy' partition, it may be possible to improve performance of the particular database statement by re-writing the statement or improving the infrastructure of the partition.

Thus, by tracking wait times at the 'partition level,' it may be possible to provide useful 'drill-down' information to a user (for example, a database administrator).

In a third use case (see FIG. 4C), it is possible to determine, for a given target partition that is accessed by multiple database statements over a period of time, relative wait times of database statements. In the event that a particular database statement causes a given partition of a table or index that is accessed by a 'heavy-accessing' database statement to be 'heavy' (i.e. associated with a lot of wait time), then one or more database tuning actions may be advisable.

As will be discussed below, it is possible to track 'wait time' of a database statement on a partition in a number of ways. In one example, it is possible to determine when statement is waiting for a particular file or block of the file system (e.g. either waiting for an I/O event to such as a read to be completed or for a lock on the 'owner' table or index of the partition to be releated).

Towards this end, it may be useful to maintain a 'mapping table' which associates file/block identifiers of the file system with partition identifiers. Whenever the database statement is determined to be waiting for a certain file/block combination, it may be assumed that the database statement is 'waiting' for (i.e. accessing or waiting to access) a partition associated with file/block combination.

Before the figures are discussed, some non-limiting use cases are presented.

Use Case 1

Consider a database statement which is required to: (i) first access data from table A; (ii) then access data from table B; (iii) then carry out some CPU-bound operation such as comparing data accessed from tables A B; and (iv) then to, once again, access data from table A.

It is possible to break down the total "wait time" of the database statement into: (i) a first component of the wait time ($WT\_1$) which is the number of seconds (or any other time unit) accessing table A (this is I/O wait time when accessing the table or waiting for a lock on the table—the statement must 'wait' for this operation to complete and cannot continue execution until this operation finishes); (ii) a second wait time component ($WT\_2$) which is the number of seconds accessing table B (this may be lock and/or I/O wait time); (iii) a third wait time component ($WT\_3$) which is the number of seconds carrying out the CPU-bound operation; and (iv) a four component ($WT\_4$) which is the number of seconds accessing table A the second time (this may be I/O and/or lock wait time).

It is possible to "break down" the total wait time of executing the statement as follows:

The total wait time is $WT\_1+WT\_2+WT\_3+WT\_4$.

The total I/O wait time is $WT\_1+WT\_2+WT\_4$.

The fractional contribution of table A to the total I/O wait time is:

$$(WT\_1+WT\_4)/(WT\_1+WT\_2+WT\_4)$$

The fractional contribution of table B to the total I/O wait time is:

$$(WT\_2)/(WT\_1+WT\_2+WT\_4)$$

Use Case 2

In this example, (i) when accessing table B the first time, first partition U is accessed (i.e. either reading the partition and/or waiting for a lock on partition U to free up) for $WT\_U\_1$ seconds, and then partition V was accessed for $WT\_V\_1$ seconds, and then partition U was accessed for $WT\_U\_2$ seconds.

In this example, the relative contribution of the partition U to the total wait time on table B is: $(WT\_U\_1+WT\_U\_2)/WT\_2$;

The relative contribution of the partition V to the total wait time on table B is: $(WT\_V\_1)/WT\_2$.

Thus, it is possible to decompose the wait time on table B into two components: (i) a wait time contribution attributable to partition U; and (ii) a wait time contribution attributable to partition V Use Case 3

Examples 1 and 2 relate to tables. It is appreciated that the same technique may be applied to database indexes A Discussion of FIG. 1

Figure 1:
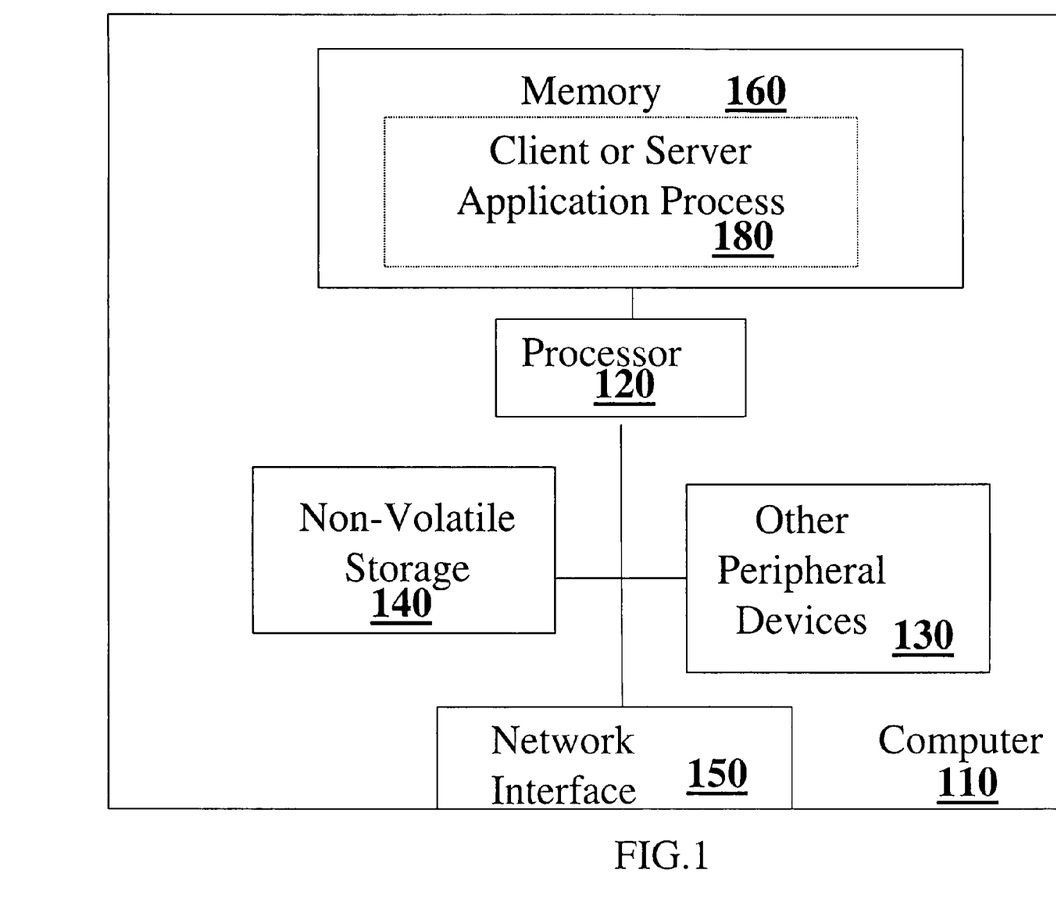
FIG. 1 is a block diagram of a computer in accordance with exemplary embodiments of the present invention.

FIG. 1 illustrates one embodiment of a computer 110 including a processor 120. Processor 120 is shown coupled to a memory 160, a non-volatile storage 140, a video display device 135, a mouse 145, a keyboard 155, and a network interface 150 such as a network interface card. It is appreciated that not every element is required in every embodiment.

Processor 120 may be configured to execute instructions and to process data according to a particular instruction set architecture (ISA). In one embodiment, processor 120 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 160 may comprise any suitable type of system memory as described above, such as FB-DIMM, DDR/DDR2 SDRAM, or RDRAMD☐, for example. Memory 160 may include multiple discrete banks of memory. Also, in some embodiments memory 160 may include multiple different types of memory.

In some embodiments, computer 110 may include more than one instance of the devices shown, such as more than one processor 120, for example. In various embodiments, computer 110 may be configured as a rack-mountable server system, a standalone system, or in any other suitable form factor. In different embodiments, computer 110 may be configured as a client system or as a server system.

Figure 3:
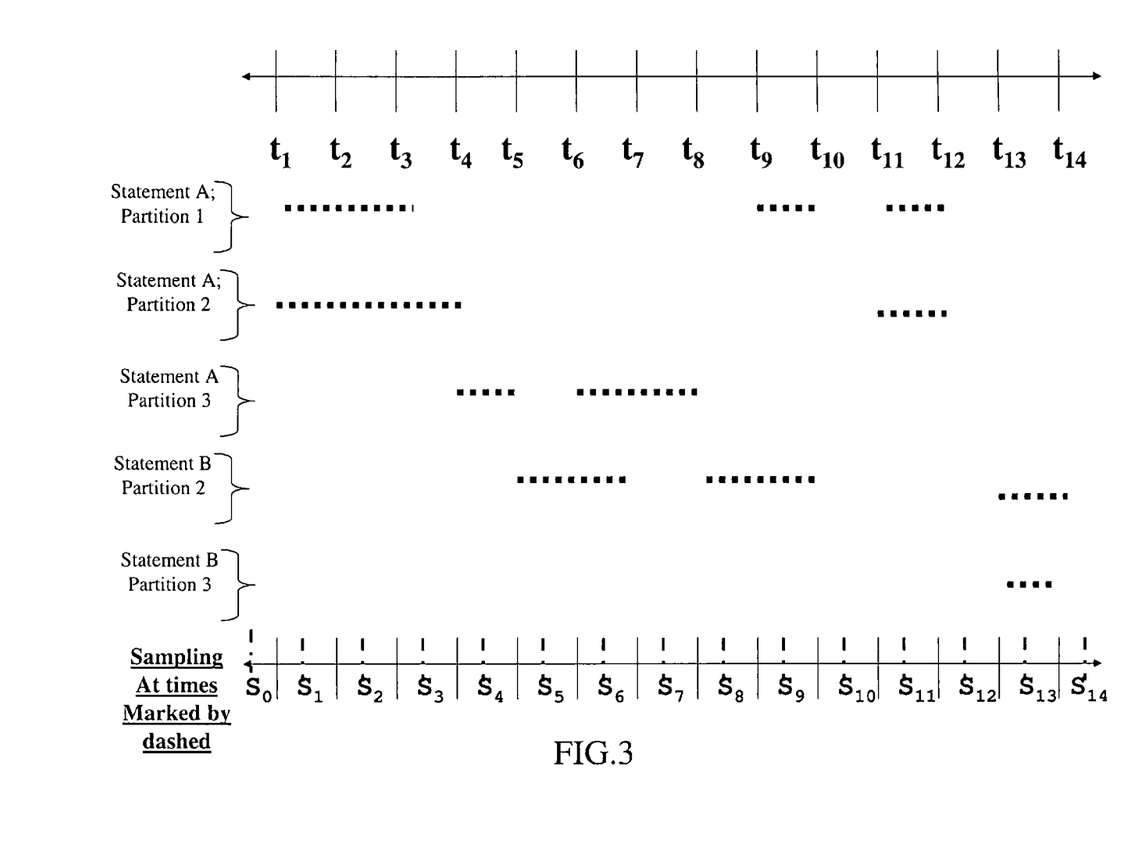
FIG. 3 describes an example where executing database statements waits for various index or table partitions.

In one embodiment, processor 120 may be configured to run operating system software such as Microsoft Windows, IBM AIX or Sun Microsystems Solaris. Operating system software may in turn provide an environment in which processor 120 may execute additional software modules in the form of applications, programs, or processes designed to perform specific functions. Running operating system software or software modules may comprise executing instructions that are stored in memory 160. As shown in FIG. 3, a client or server application process resides in the memory 160.

Software modules that may be executed by processor 120 may include, in one embodiment, client/server software such as a web server or a web browser. Alternatively, or in addition, processor 120 may execute software modules comprising network management software, office productivity tools, e-mail programs, etc. Many other types of software may be executed such as a virtual machine runtime environment, a database, an application server, and diagnostic, monitoring, profiling, or analysis software. Furthermore, while executing such software, processor 120 may retrieve data from and store data in non-volatile storage 140 or in memory 160.

As shown in FIG. 1, a client or server application process 180 to be performance-monitored resides in memory 160. In one embodiment, one or more software processes may perform the function of profiling other software processes (e.g. process 180) during operation, gathering and storing data indicative of the operation of one or more of the other software processes. The performance-monitored software application may reside on computer 110. Alternatively or additionally, the performance-monitored software application may reside on a different computer. These monitored application (i.e. database management system) may reside on a single computer 110 or may be a distributed or clustered application residing on a plurality of computers 110.

DEFINITIONS

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

During a time interval, a "given" database statement may be executed multiple times, and may be "involved" with multiple distinct "table-read" or "index-read" or 'partition read" operations (i.e. over multiple executions, or in a single execution). The aggregate wait time (for a partition or index or table) is the total wait time (i.e. the total amount of time that the given database statement must wait for a 'disk-sort' operation to complete during execution), summed over all of the 'partition-read' or 'index-read' or 'table-read' operations.

Figure 2:
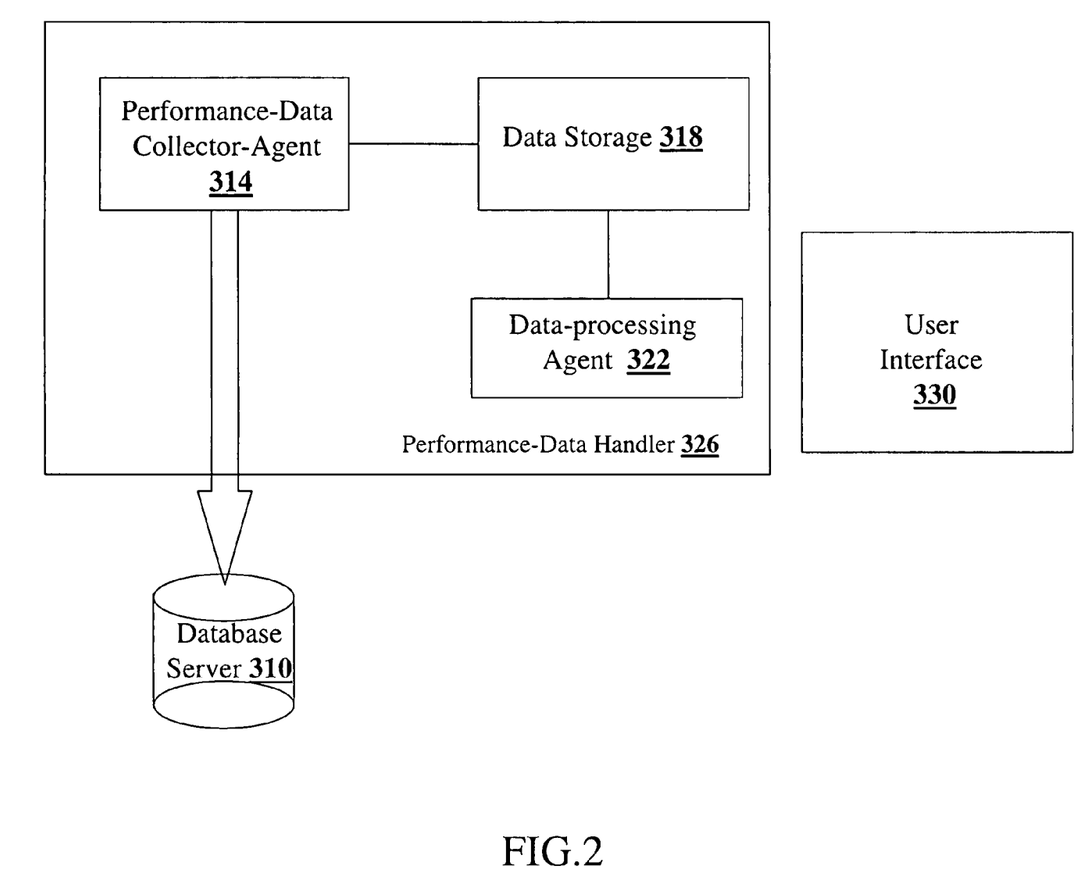
FIG. 2 is a block diagram of a system for performance-monitoring a database in accordance with some embodiments.

Discussion of FIG. 2

FIG. 2 provides a block diagram of an exemplary architecture for (a) collecting performance data for an executing configurable database 310 including data describing wait times of 'partition read' and/or 'table-read' and/or index-read' operations; (b) storing the collected performance data in a data storage 318; (c) analyzing or processing the data, using data-processing agent 322 which may 'process' stored information about database performance.

It is appreciated the data storage 318 may store data other than the performance data. The data of the data storage 318 may be accessible by any number of executing processes on a single computer 110 or from multiple computers. Furthermore, data storage 318 may be implemented in any combination of volatile memory 160 (including but not limited to RAM) and non-volatile storage 140 (including but not limited to magnetic storage and flash storage).

As with any embodiment of the present invention, the system of FIG. 2 as a whole as well as each individual component may all reside on a single computer 110 or may be 'distributed' among more than one computer 110 in communication via a local or wide-area computer network.

Database server 310 or database management system is typically a relational database, including but not limited to Oracle®, SQLServer®, Sybase®, IBM DB2®, and MySQL®.

As used herein, an 'agent' (for example, collector agent 314 or data storage agent 326) refers to computer code (i.e. stored on a computer-readable medium) whose execution is operative to carry out one or more tasks. The computer code may be implemented in any single computer language or combination of computer languages, including but not limited to machine-readable code (for example, machine language or assembler), so-called intermediate code (for example, Java byte code or .NET), compiled code (for example, compiled C++ code), and human readable code (for example, query language code such as SQL; for example, scripting code). The agent may be deployed in any number of process spaces, and on any number of computers 110 (for example, residing on a single computer 110, or the agent may be 'distributed' among a plurality of machines).

A 'collector agent' is operative to collect performance data an on ongoing basis—i.e. by collecting a sample of performance data at different times (i.e. repeatedly collecting different samples of performance data). In one non-limiting example, the collector agent includes one or more computer-executable code modules stored on a storage medium.

A "database-processing agent" is operative to process or analyze performance data. In one non-limiting example, the data-processing agent includes one or more computer-executable code modules stored on a storage medium.

In the example of FIG. 2, the system provides a user interface 330 (for example, a graphic user interface (GUI)) for presenting (i.e. displaying, for example, on a computer screen) performance data in accordance with at least one of any output of performance-data handler 326. User interface 330 (i.e. which is a performance-data presentation interface)

and performance-data handler 326 may be implemented in any combination of hardware and/or executable code modules.

Performance-data collector agent 314, data storage 318, and data-processing agent 322 are collectively referred to as a performance-data handler 326.

A Discussion of FIG. 3

Reference is now made to FIG. 3. FIG. 3 illustrated times that different statements "wait" for read operations for different partitions to complete.

Fractional Wait Times for Statement A

Reference is made to the first row of FIG. 3, which describes statement A reading from partition 1. Thus, statement A 'waits for' (i.e. during execution) a 'table read operation" (or 'index read' operation or when waiting for a lock to be released from a table or index) that begins at t1 and ends at t3. After that, statement A waits for partition 1 from t9 until t10 (i.e. execution of statement A require may data to be read from partition 1—the wait time may be associated with reading the data and/or waiting for a lock to free—this data is read between times t9 and t10—during that time statement A may be said to 'wait for' reading of partition 1—i.e. 'wait time' associated with executing statement A may be 'attributable to' partition 1.'

Thus, in the example of FIG. 3, a total aggregate wait time for a statement A for partition 1 is:

$$t3-t1+t10-t9+t12-t11$$

A total aggregate wait time for statement A for partition 2 is (t3−t1)+(t12−t11).

A total aggregate wait time for statement A for partition 3 is (t5−t4)+(t8−t6).

If we assume that all I/O and/or lock wait time for statement A is illustrated in FIG. 3, then the fraction of some sort of total wait time for statement 1 (i.e. as whole) that is attributable to partition 1 is:

$$[t3-t1+t10-t9+t12-t11]/[t3-t1+t10-t9+t12-t11+(t4-t1)+(t12-t11)+(t5-t4)+(t8-t6)].$$

Similar calculations may be made for partitions 2 and 3.

Assuming the total wait time (i.e. I/O wait time and/or lock wait time and/or some other total wait time) for statement A is T_W_T_A (abbreviation for total wait time for A), then the fraction of total wait time for statement 1 that is attributable to partition 1 is:

$$[t3-t1+t10-t9+t12-t11]/T\_W\_T\_A.$$

In some embodiments, the fractional wait times (either I/O or total or any other type of wait time in the denominator) may be determined for a plurality of statements, and a description of these fractions may be presented to a user.

Fractional Wait Time for Partition 2

A total aggregate wait time for a plurality of database statements for partition 2 is:

$$(t4-t1)+(t12-t11)+(t7-t5)+(t10-t8)+(t14-t13).$$

Assuming that all wait time for partition 2 is included in FIG. 3:

A fraction of the total wait time on partition 2 that is 'attributable to' execution of statement A is:

$$[(t4-t1)+(t12-t11).]/[(t4-t1)+(t12-t11)+(t7-t5)+(t10-t8)+(t14-t13).]$$

A fraction of the total wait time on partition 2 that is 'attributable to' execution of statement B is:

$$[(t7-t5)+(t10-t8)+(t14-t13).][(t4-t1)+(t12-t11)+(t7-t5)+(t10-t8)+(t14-t13).]$$

Figure 4A:
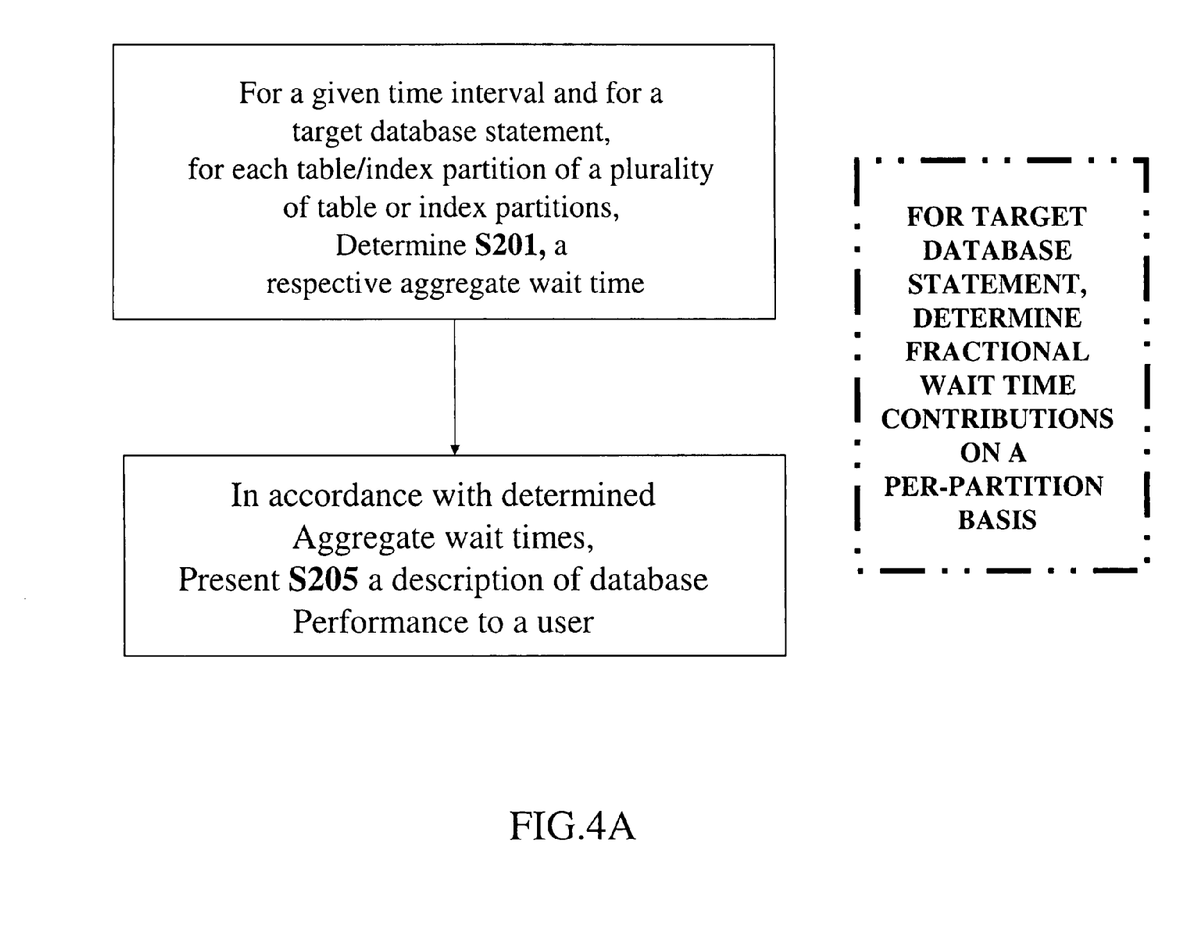
FIGS. 4A-4C, 6-7 are flow charts of routines for performance-monitoring a database and for presenting information describing database performance in accordance with some embodiments.
Figure 4B:
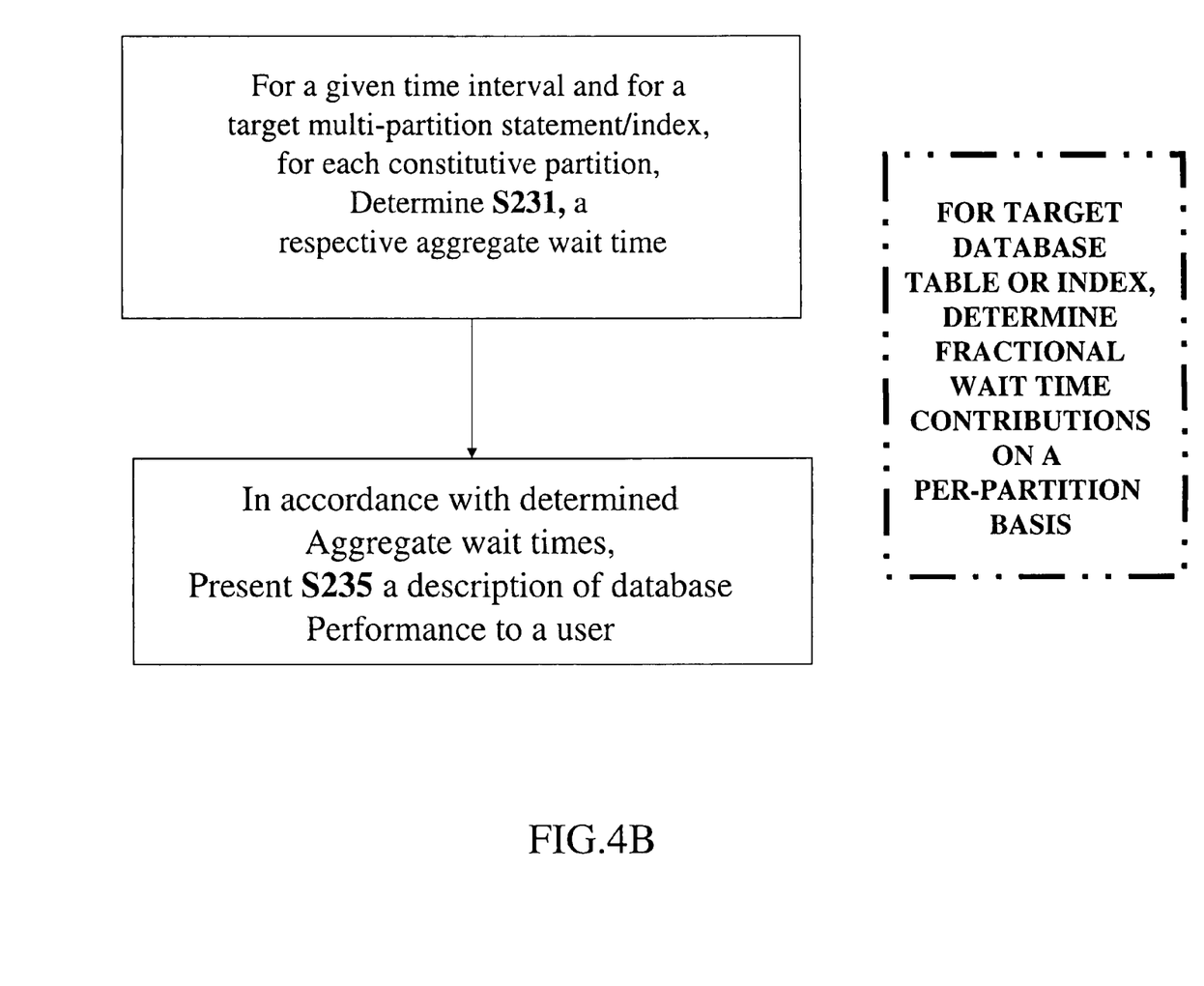

Similarly, if we assume that partitions 1 and 2 are part of the same table (or index), and this table or index includes only 2 partitions, it is possible to determine relative 'wait time contributions' of partitions 1 and 2 to the 'owner table.' Then a technique such as the technique described in FIG. 4B may be used.

Some embodiments of the present invention relate to presenting 'fractional wait times' for a given partition (i.e. of a table or of an index) on a 'per-statement' basis.

In the example of FIG. 3, fractional wait times may be determined for a 'target' partition of a table or an index (i.e. the fractional contribution for each statement may be determined as above).

Furthermore, in the example of FIG. 3, fractional wait times may be determined for a target 'statement' (for example statement A)—see FIG. 4A).

Figure 4C:
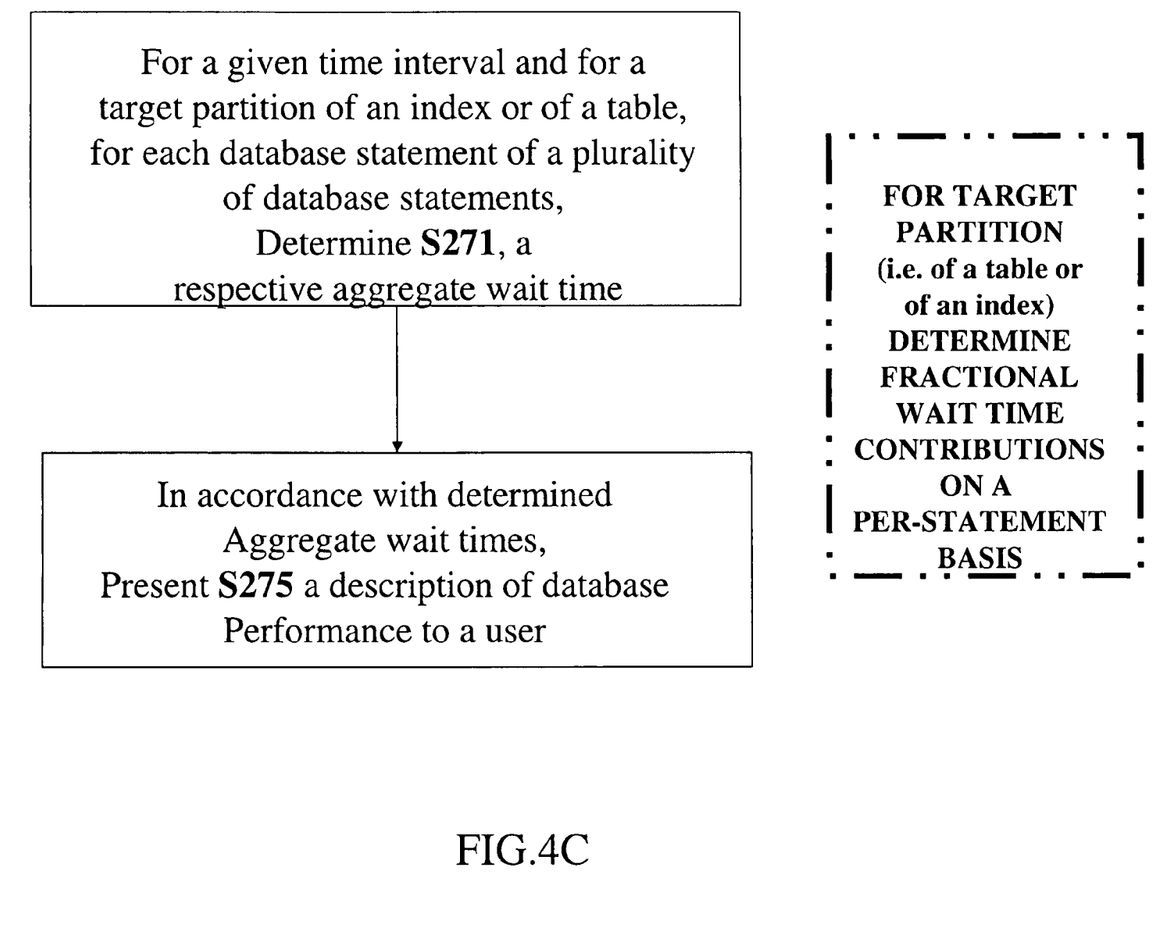

Discussion of FIGS. 4A-4C

Reference is made to FIG. 4A. In step S201, aggregate wait times (for example, estimated aggregate wait times) are determined for each partition of a plurality of partitions that are accessed by a given database statements.

In step S205, performance data is presented.

Thus, in the technique of FIG. 4A, relatively 'heavy' partitions that have a 'high contribution' to the wait time of a given database statement may be identified and/or presented to a user.

Reference is made to FIG. 4B. In step S231, aggregate wait times (for example, estimated aggregate wait times) are determined for each partition of a plurality of partitions of a multi-partition table or index. In step S235, performance data is presented.

Reference is made to FIG. 4C. In step S251, aggregate wait times (for example, estimated aggregate wait times) are determined for each database statement of a plurality of statements that accesses a given or 'target' partition. In step S255, performance data is presented.

Figure 5:
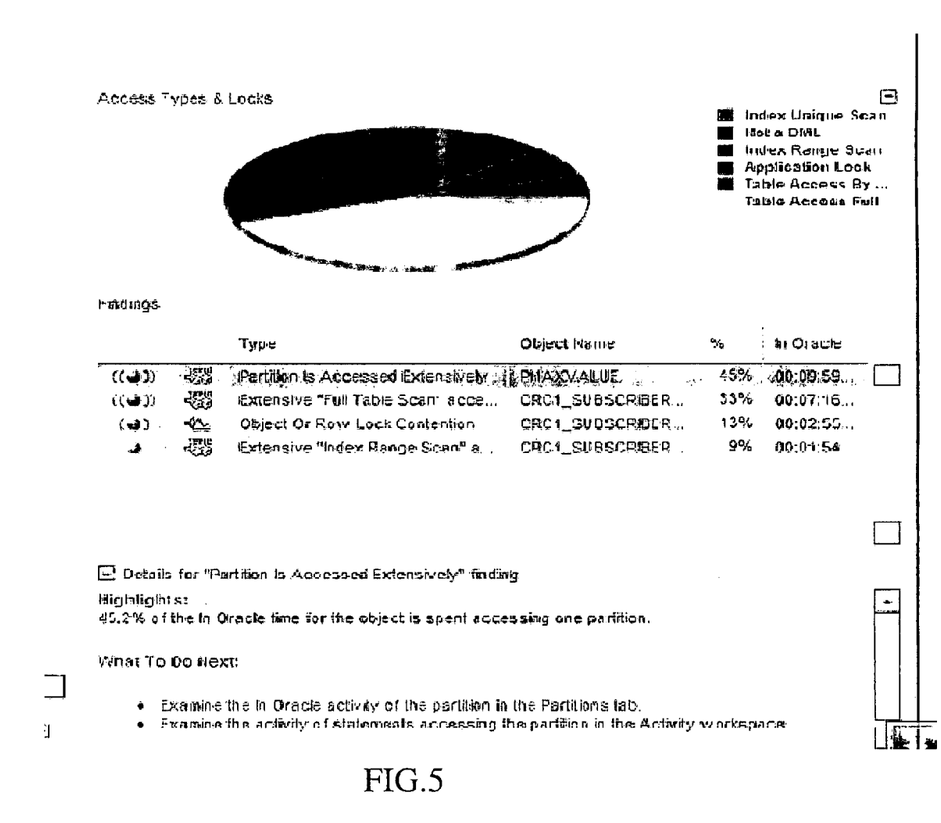
FIG. 5 is a screen shot of an exemplary interface for presenting information describing database performance in accordance with some embodiments.

A Brief Discussion of FIG. 5

In another example, a table (or index) includes some number of partitions. In this example, aggregate wait times for both the table (or index) and each constitutive partition may be determined. In this example, fractional wait times may be determined (and presented) for each 'constitutive' partition of the table (or index) may be determined. See FIG. 5 which illustrates wait time break down for a 'target' on a per-partition basis—it notes that 45.2% of the Oracle time of the table object is spent accessing one partition. The 'second heaviest' of the partitions 'contributes' 33% of the wait time.

In the example of FIG. 5, the partitions are ranked according to the relative magnitudes of the wait time contributions (i.e. 45% is greater than 33% which is greater than 13% which is greater than 9%). Alternatively or additionally, a decision about whether or not to present data about a particular partition (or database statement) made be made accordance with a magnitude of an aggregate wait time for the partition—in this case, the information may be presented conditionally, and may be 'contingent' upon a give partition or statement having a relatively 'large' absolute or relative wait time.

Figure 6:
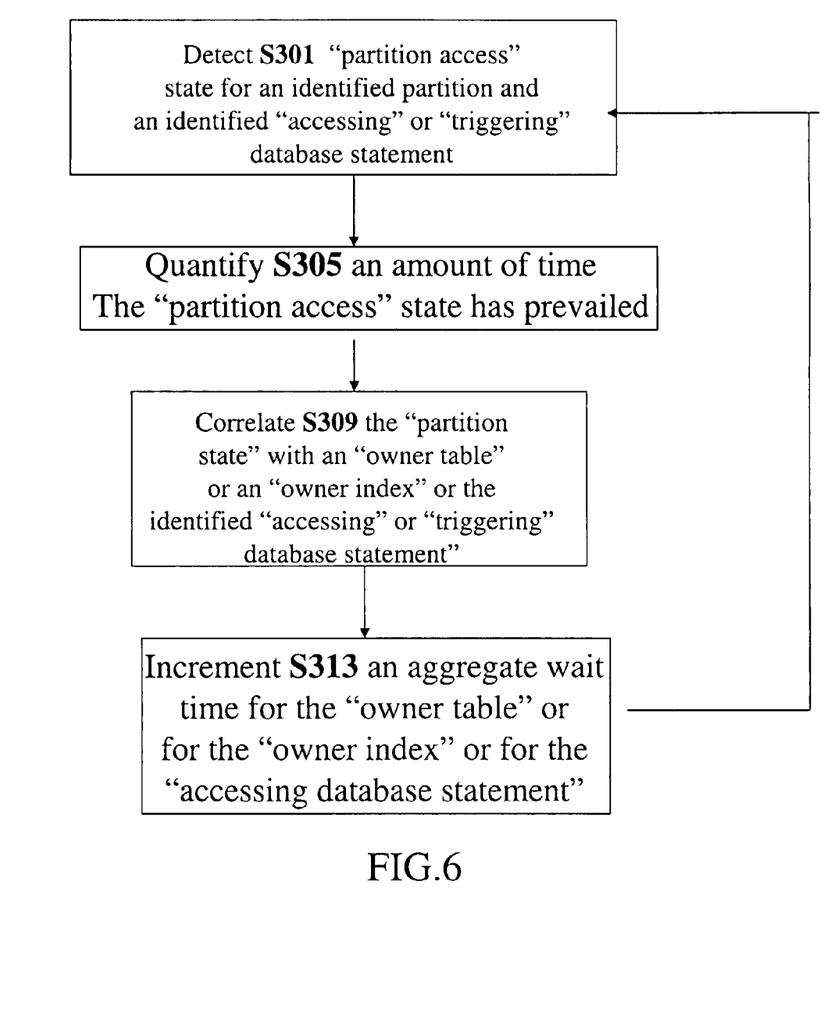

Discussion of FIG. 6

In some embodiments, the amount of 'wait time' for a partition or a table or an index may be determined as follows (see FIG. 6):

(i) in step S301, a partition access state may be detected. In some embodiments, one or more 'system data structures' may be read (for example, by reading a system table and/or sampling 'system memory' It may be possible for a moment in time to determine from system memory (for example, of Oracle): (i) if a 'given database statement' is in a state of I/O wait; and (ii) if so, an identifier of a file and/or block(s) for which the 'given database statement' is waiting.

(ii) in step S305, an amount of wait time may be quantified;

(iii) in step S309, the wait time may be correlated with a partition or index or table or statement; and (iv) in step S313, the aggregate wait time may be incremented—for example, referring to FIG. 3 the 'aggregate wait time' for statement A partition 1 may be increment by t3–t1 (or an approximation thereof) at time t3 (or shortly thereafter).

Figure 7:
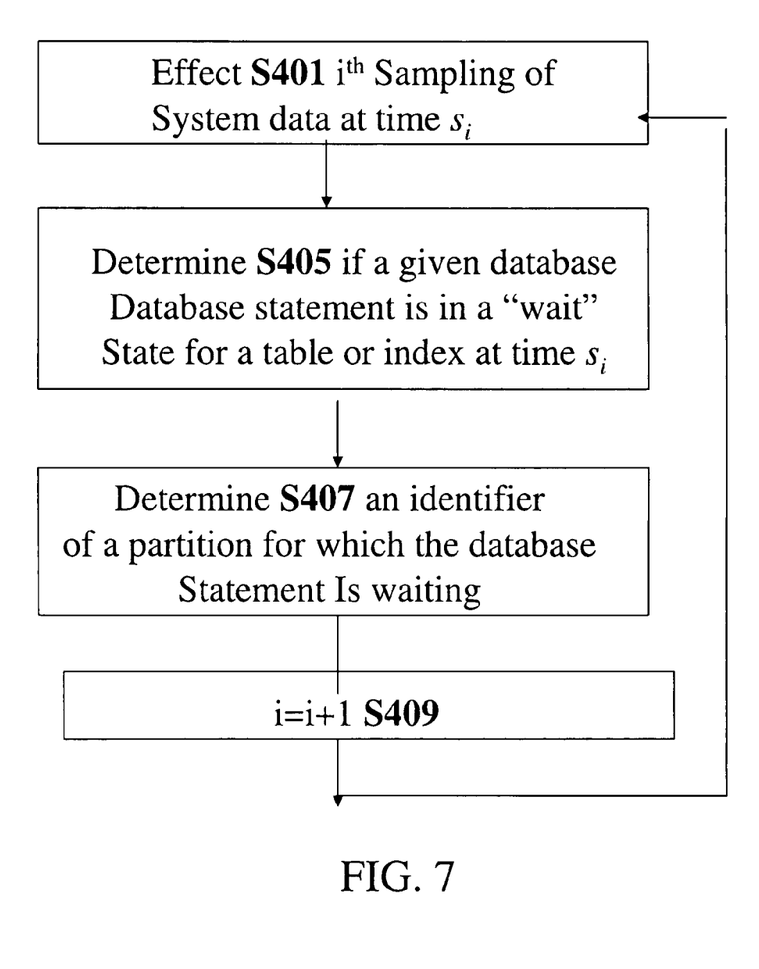

As illustrated in FIG. 7, the sampling or reading of system data may be carried out repeatedly sampling in step S401 'system data' or 'system memory' periodically during the 'time interval'—for example, once every few seconds or even more frequently. In step S405, it may be determined if a statement is in a 'wait state.' In step S407, this wait state may be correlated with an identifier of a partition. In step S409, dummy variable i is increment.

Additional Discussion

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb. All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise. The term "such as" is used herein to mean, and is used interchangeably with, the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method for displaying information related to performance of a given database statement which accesses a plurality of multi-partition objects during a time interval, the method comprising:
   a) determining, by a processor, for a given database statement that accesses a plurality of index or table partitions during the time interval, for each accessed partition of a plurality of partitions, a respective aggregate wait time associated with said accessed partition;
   b) in accordance with the determined wait times for the given database statement, presenting, to a user, a description of performance of the database during the time interval, that includes, for each accessed partition, an indication of a ratio between:
      i) said respective aggregate wait time associated with said accessed partition; and
      ii) a total wait time associated with executing the given database statement during the time interval.

2. The method of claim 1 wherein step (a) is carried out for a plurality different database statements, each database statement being associated with a different plurality of partition aggregate wait times.

3. The method of claim 1 where presenting of the description of the database performance includes presenting indications of the plurality of the determined aggregate wait times.

4. The method of claim 1 the presented indications are ranked in accordance with relative magnitudes of the ratios.

5. A method for displaying information related to performance of a database during a time interval, the method comprising:
   a) determining, by a processor, for a given multi-partition table or multi-partition index that is accessed by a plurality of database statements during the time interval, a respective aggregate wait time, for the time interval, for each partition of the multi-partition table or index; and
   b) in accordance with the determined wait times for the given database statement, presenting, to a user, a description of performance of the database during the time interval, that includes for each accessed partition, an indication of a ratio between:
      i) said respective aggregate wait time associated with said accessed partition; and
      ii) an aggregate wait time for the multi-partition index or table for the time interval.

6. The method of claim 5 wherein step (a) is carried out for a plurality different database indexes, each database index being associated with a different plurality of partition aggregate wait times.

7. The method of claim 6 wherein step (a) is carried out for a plurality different database tables, each database table being associated with a different plurality of partition aggregate wait times.

8. The method of claim 5 the presented indications are ranked in accordance with relative magnitudes of the ratios.

9. A method for displaying information related to performance of a database during a time interval, the method comprising:
   a) determining, by a processor, for a given partition that is part of a multi-partition table or index, the given partition being that is accessed by a plurality of database statements during the time interval, a respective aggregate wait time for the time interval for each accessing database statement of the given partition; and b) in accordance with the determined wait times for the given partition, presenting, to a user, a description of performance of the database during the time interval, that includes for each accessing database statement, an indication of a ratio between:
   i) said respective aggregate wait time associated with access of the accessing database statement to the given partition; and
   ii) a total wait time associated with the given partition during the time interval.

10. The method of claim 9 wherein step (a) is carried out for a plurality of different partitions, each partition being associated with a different plurality of partition aggregate wait times.

11. The method of claim 9 where presenting of the description of the database performance includes presenting indications of the plurality of the determined aggregate wait times.

12. The method of claim 9, the presented indications are ranked in accordance with relative magnitudes of the ratios.

* * * * *

UNITED STATES PATENT AND TRADEMARK OFFICE
CERTIFICATE OF CORRECTION

| | | |
|---|---|---|
| PATENT NO. | : 8,051,055 B1 | Page 1 of 1 |
| APPLICATION NO. | : 12/188091 | |
| DATED | : November 1, 2011 | |
| INVENTOR(S) | : Sigal Gelbart et al. | |

It is certified that error appears in the above-identified patent and that said Letters Patent is hereby corrected as shown below:

Column 12, claim 6:

Line 51 should be corrected as follows:
change

--a plurality different database indexes, each database index....-- to

"a plurality different database tables, each database table...."

Column 12, claim 7:

Line 55 should be corrected as follows:
change

--a plurality different database tables, each database table being....-- to

"a plurality different database undexes, each database index being...."

Signed and Sealed this
Third Day of January, 2012

David J. Kappos
*Director of the United States Patent and Trademark Office*